US011789473B2

(12) United States Patent
Yourlo et al.

(10) Patent No.: US 11,789,473 B2
(45) Date of Patent: Oct. 17, 2023

(54) INK DELIVERY SYSTEM WITH GRAVITY, VALVE AND PUMP CONTROL OF BACKPRESSURE

(71) Applicant: Memjet Technology Limited, Dublin (IE)

(72) Inventors: Zhenya Yourlo, North Ryde (AU); Mohammadreza Behi, North Ryde (AU); Peter Crichton, North Ryde (AU); Norman Micheal Berry, North Ryde (AU)

(73) Assignee: Memjet Technology Limited, Dublin (IE)

( * ) Notice: Subject to any disclaimer, the term of this patent is extended or adjusted under 35 U.S.C. 154(b) by 0 days.

(21) Appl. No.: 17/713,504

(22) Filed: Apr. 5, 2022

(65) Prior Publication Data

US 2022/0332123 A1    Oct. 20, 2022

Related U.S. Application Data

(60) Provisional application No. 63/174,988, filed on Apr. 14, 2021.

(51) Int. Cl.
*G05D 16/06* (2006.01)
*B41J 2/175* (2006.01)

(52) U.S. Cl.
CPC ...... *G05D 16/0644* (2013.01); *B41J 2/17596* (2013.01); *G05D 16/0658* (2013.01); *G05D 16/0661* (2013.01)

(58) Field of Classification Search
CPC ............ B41J 2/17596; G05D 16/0661; G05D 16/0644; G05D 16/0658
See application file for complete search history.

(56) References Cited

U.S. PATENT DOCUMENTS

| | | | | |
|---|---|---|---|---|
| 8,991,955 | B2* | 3/2015 | Borra | B41J 2/17596 347/89 |
| 10,252,540 | B2* | 4/2019 | Meyer | B41J 2/17556 |
| 10,639,903 | B2* | 5/2020 | McAuliffe | B41J 2/18 |
| 11,433,685 | B2* | 9/2022 | Yourlo | B41J 2/175 |

* cited by examiner

*Primary Examiner* — An H Do
(74) *Attorney, Agent, or Firm* — Cooley LLP

(57) ABSTRACT

An ink delivery system for supplying ink to an inkjet printhead at a predetermined backpressure. The ink delivery system includes: a pressure regulating valve connected to a printhead inlet port; an ink tank connected to a valve inlet of the pressure regulating valve; and a pump connected to a printhead outlet port. The backpressure of ink supplied to the printhead is controlled by: a height $h_1$ of ink in the ink tank relative to a valve orifice, a height $h_2$ of the valve orifice relative to the printhead, a position of a valve member relative to the orifice and a pump speed of the pump.

13 Claims, 4 Drawing Sheets

INK DELIVERY SYSTEM WITH GRAVITY, VALVE AND PUMP CONTROL OF BACKPRESSURE

CROSS REFERENCE TO RELATED APPLICATIONS

This application claims priority to and the benefit of U.S. Provisional Patent Application No. 63/174,988, entitled PRESSURE-REGULATING VALVE AND INK DELIVERY SYSTEM FOR INKJET PRINTHEAD, filed on Apr. 14, 2021, the disclosure of which is incorporated herein by reference in its entirety for all purposes.

FIELD OF THE INVENTION

This invention relates to a pressure regulating valve for controlling pressure at an inkjet printhead. It has been developed primarily for supplying ink to an inkjet printhead at a relatively constant pressure, as well as lowering the cost of ink delivery systems.

BACKGROUND OF THE INVENTION

Inkjet printers employing Memjet® technology are commercially available for a number of different printing formats, including small-office-home-office ("SOHO") printers, label printers and wideformat printers. Memjet® printers typically comprise one or more stationary inkjet printheads, which are user-replaceable. For example, a SOHO printer comprises a single user-replaceable multi-colored printhead, a high-speed inkjet press comprises a plurality of user-replaceable monochrome printheads aligned along a media feed direction, and a wideformat printer comprises a plurality of user-replaceable printheads in a staggered overlapping arrangement so as to span across a wideformat pagewidth.

Supplying ink to multiple printheads can be problematic as the number of printheads increases. In order to maintain high print quality, each printhead should receive ink at about the same ink pressure from a common ink reservoir.

U.S. Pat. No. 10,252,540, the contents of which are incorporate herein by reference, describes an ink delivery system suitable for a digital inkjet press having multiple printheads. This system uses gross pressure control in a common ink delivery module and local fine pressure control in each print module containing a respective printhead. Due to the high ink flow requirements of multiple inkjet printheads as well as the need to control pressure in positive and negative pressure ink lines, two diaphragm pumps are required for controlling ink pressure in the ink delivery module. These diaphragm pumps are necessarily large, high quality pumps, which operate in combination with local electronically-controlled pressure regulators in each print module. Accordingly, the ink delivery system is an expensive system due to the high cost of two diaphragm pumps as well the electronically-controlled pressure regulators in each print module.

For inkjet printing systems having a small number of print modules (e.g. one or two print modules), an expensive ink delivery module designed for larger systems is undesirable and adds significantly to the overall cost of the system. U.S. application Ser. No. 17/180,401 filed Feb. 19, 2021 describes an ink delivery module suitable for inkjet printing systems having a small number of printheads. The ink delivery module uses a low-cost air pump cooperating with flow restrictors as a means for regulating pressures in an ink supply tank and an ink return tank, which are connected to an ink supply line and an ink return line, respectively.

Passive pressure regulating valves have been proposed as a suitable means for controlling ink pressure in inkjet printing systems. For example, U.S. Pat. No. 7,712,880 (assigned to Memjet Technology Ltd) describes a pressure regulating valve having a diaphragm and a biasing mechanism, which cooperate to open and sealingly close a valve member against a valve seat in response to ink pressure changes. U.S. Pat. No. 7,862,138 (assigned to Hewlett-Packard Development Company, L.P.) describes a pressure regulating valve operating using a similar principle: a biased diaphragm is connected to a valve member via a lever mechanism in order to sealingly close or open an orifice.

Pressure regulating valves have the advantages of low cost and localized pressure control in proximity to the printhead. However, the valves described in the above-mentioned prior art suffer from the drawback of hysteresis caused by sealingly closing and opening an orifice, as well as fluctuating pressures. Furthermore, high flow rates cannot be readily achieved via an opening and closing valve.

It would therefore be desirable to provide a low-cost means for regulating ink pressure, which at least ameliorates some of the drawbacks of prior art pressure regulating systems described above.

SUMMARY OF THE INVENTION

In a first aspect, there is provided a pressure regulating valve for an inkjet printhead, said valve comprising:
an inlet port;
an outlet port;
a fluid flow path defined between the inlet port and the outlet port;
a first orifice positioned in the flow path, the first orifice having a sealable first seat;
a movable first valve member configured for sealing engagement with the first seat;
a second orifice positioned in the flow path;
a movable second valve member configured for regulating a fluid flow rate through the second orifice;
a regulator chamber having the outlet port and comprising a diaphragm operatively connected to the second valve member, such that movement of the diaphragm moves the second valve member relative to the second orifice; and
a biasing mechanism for resiliently biasing the diaphragm away from the second orifice.

The pressure regulating valve according to the first aspect has the advantage of controlling fluid flow to the printhead without requiring a valve member to function as a shut-off valve during idle periods of the printhead. Advantageously, the shut-off function is handled by the actuated (e.g. solenoid actuated) first valve member, while the pressure-regulating function is handled by the diaphragm-controlled second valve member having no sealing or shut-off function.

Preferably, the second orifice is downstream of the first orifice.

Preferably, the first valve member comprises a compliant plug for sealing engagement with the first seat.

Preferably, the first valve member is operatively connected to an actuator, such as a solenoid, for opening and sealingly closing the first orifice. Typically, the first valve member is sealingly closed against the first orifice when the solenoid is powered down.

Preferably, the biasing mechanism comprises a spring operatively connected to the diaphragm, wherein the spring biases the second valve member towards closure of the second orifice.

Preferably, in use, the diaphragm and the spring cooperate to passively control a flow rate through the second orifice. For example, contraction of the diaphragm towards the second orifice, caused by a reduction in pressure in the regulating chamber, tends to move the second valve member towards opening of the second orifice. At the same time, the contraction of the diaphragm is opposed by the bias of the spring, thereby providing passive regulation of the flow rate through the second orifice via the balance of forces between the diaphragm and the spring.

Preferably, the second valve member and the second orifice have rigid engagement surfaces. The rigid engagement surfaces (e.g. metal, rigid plastics etc.) are typically non-sealing so as to avoid the surfaces sticking and causing hysteresis in pressure management during use.

Preferably, movement of the diaphragm towards the second orifice progressively opens the second orifice thereby to increase a flow rate therethrough, and movement of the diaphragm away from the second orifice progressively occludes the second orifice to decrease the flow rate therethrough. Typically, the second orifice is not fully occluded (i.e. closed) during printing.

Preferably, a decrease in pressure in the regulator chamber moves the diaphragm towards the second orifice.

Preferably, an outer surface the second valve member is flared away from the diaphragm.

Preferably, the outer surface of the second valve member is non-linearly flared.

Preferably, linear movement of the second valve member through the second orifice produces a linear change in an occluded area of the second orifice, such that the flow rate through the second orifice is linearly proportional to a distance moved by the second valve member.

In a related aspect, there is provided an inkjet printer comprising:
 the pressure regulating valve as described above;
 an ink tank connected to the inlet port; and
 an inkjet printhead connected to the outlet port.

Preferably, the ink tank is positioned at a height above the pressure regulating valve for supplying ink at a positive pressure under gravity to the inlet port.

Preferably, the inkjet printhead pulls a negative ink pressure at the outlet port during printing.

Preferably, a vacuum source connected to the inkjet printhead pulls a negative pressure at the outlet port during at least some non-printing periods.

Preferably, in use, the pressure regulating valve maintains a negative ink pressure at the printhead within a predetermined pressure range.

Preferably, a level of ink in the ink tank is at a height h1 above the orifice; the orifice is positioned at a height h2 relative to the printhead; and a backpressure of ink supplied to the printhead is controlled by: h1, h2, a position of the valve member relative to the orifice and a pump speed of a pump connected to a printhead outlet port.

In a second aspect, there is provided an ink delivery system for supplying ink to an inkjet printhead at a predetermined backpressure, the ink delivery system comprising:
 a pressure regulating valve having a valve outlet connected to a printhead inlet port, the pressure regulating valve having a passively-controlled valve member for controlling a flow rate of ink through an orifice;
 an ink tank connected to a valve inlet of the pressure regulating valve, the ink tank being positioned above the pressure regulating valve and the printhead, the ink tank having an air vent open to atmosphere for suppling ink to the pressure regulating valve under gravity; and
 a pump connected to a printhead outlet port,
wherein:
 a level of ink in the ink tank is at a height $h_1$ above the orifice;
 the orifice is positioned at a height $h_2$ relative to the printhead; and
 the backpressure of ink supplied to the printhead is controlled by: $h_1$, $h_2$, a position of the valve member relative to the orifice and a pump speed of the pump.

Preferably, the pump is connected to the ink tank via an ink return line.

Preferably, the pressure regulating valve comprises:
 a regulator chamber having a diaphragm operatively connected to the valve member, such that movement of the diaphragm moves the valve member relative to the orifice; and
 a biasing mechanism for resiliently biasing the diaphragm away from the orifice.

Preferably, the pressure regulating valve is as described above in connection with the first aspect and preferred embodiments thereof.

Preferably, the height $h_1$ is controlled via one or more ink level sensors cooperating with a refill pump receiving ink from a bulk ink reservoir.

Preferably, the pressure regulating valve is positioned above the printhead. Alternatively, the pressure regulating valve is positioned below the printhead or at a same height as the printhead.

In a third aspect, there is provided a pressure regulating valve for an inkjet printhead, said valve comprising:
 a valve inlet;
 a valve outlet;
 a fluid flow path defined between the valve inlet and the valve outlet;
 an orifice positioned in the flow path;
 a movable valve member configured for regulating a fluid flow rate through the orifice;
 a regulator chamber having the valve outlet and comprising a diaphragm operatively connected to the valve member, such that movement of the diaphragm moves the valve member relative to the orifice; and
 a biasing mechanism for resiliently biasing the diaphragm away from the orifice, wherein an outer surface of the valve member is non-linearly flared away from the diaphragm.

Preferably, linear movement of the valve member relative to the orifice produces a linear change in an occluded area of the orifice, such that the flow rate through the orifice is linearly proportional to a distance moved by the valve member.

Preferably, the biasing mechanism comprises a spring operatively connected to the diaphragm, wherein the spring biases the valve member towards closure of the orifice.

Preferably, in use, the diaphragm and the spring cooperate to passively control a flow rate through the orifice.

Preferably, the valve member and the orifice have rigid engagement surfaces.

Preferably, movement of the diaphragm towards the orifice progressively opens the orifice thereby to increase a flow rate therethrough, and movement of the diaphragm away from the orifice progressively occludes the orifice to decrease the flow rate therethrough.

Preferably, a decrease in pressure in the regulator chamber moves the diaphragm towards the orifice.

In a related aspect, there is provided an inkjet printing system comprising the pressure regulating valve, as described above in connection with the first aspect.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g. pre-coats and finishers), 3D printing fluids (e.g. binder fluids), functional fluids (e.g. solar inks, sensing inks etc.) and the like. Where reference is made to fluids or printing fluids, this is not intended to limit the meaning of "ink" herein.

BRIEF DESCRIPTION OF THE DRAWINGS

Embodiments of the present invention will now be described by way of example only with reference to the accompanying drawings, in which.

DETAILED DESCRIPTION OF THE INVENTION

Ink Delivery System

Figure 1:
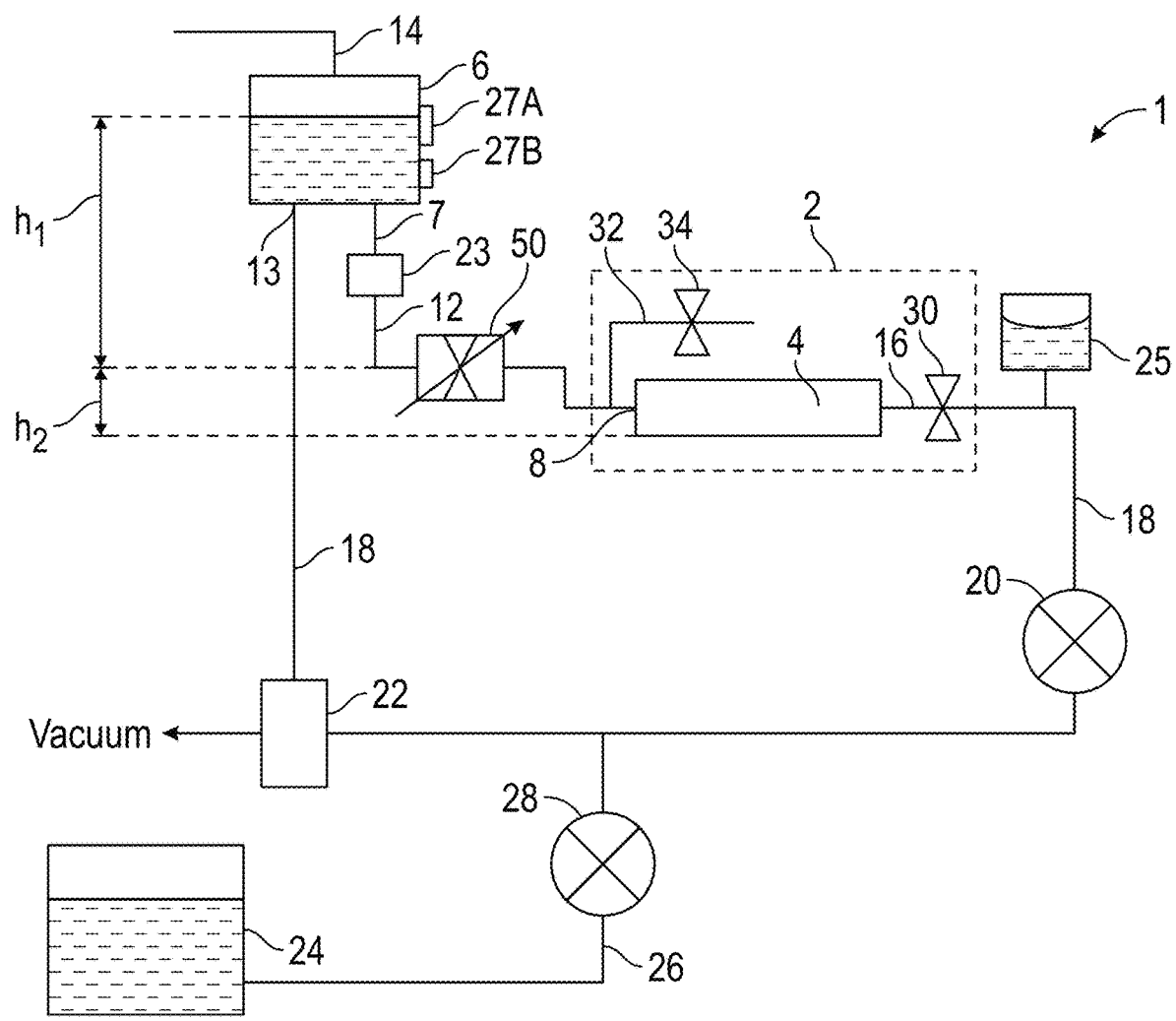
FIG. 1 shows an ink delivery system having a single printhead.

Referring to FIG. 1, there is shown schematically an ink delivery system 1 for an inkjet printing system having a print module 2 comprising an inkjet printhead 4. The printhead 4 is typically a user-replaceable pagewide (or 'linehead') printhead of the type described in, for example, US2011/0279566, U.S. Pat. No. 9,950,527 or 10,717,282, the contents of which are incorporated herein by reference.

Ink is fed to the printhead 4 by means of an intermediary ink tank 6 having a supply port 7 connected to a printhead inlet port 8 via an ink supply line 12. The intermediary ink tank 6 has a vent 14 open to atmosphere and feeds ink under gravity into the ink supply line 12. The intermediary ink tank 6 may be configured for handling degassed ink, as described in U.S. Pat. No. 10,639,903, the contents of which are incorporated herein by reference.

A return port 13 of the intermediary ink tank 6 is connected to a printhead outlet port 16 via an ink return line 18. Hence, the intermediary ink tank 6, the ink supply line 12, the printhead 4 and the ink return line 18 together form a closed fluidic loop. Typically, the ink supply line 12 and the ink return line 18 are comprised of lengths of flexible tubing.

The ink return line 18 has a circulation pump 20 (e.g. diaphragm pump) downstream of the printhead 4 for circulating ink around the closed fluidic loop.

The closed fluidic loop further comprises a degasser 22 in the ink return line 18 downstream of the pump 20 for degassing ink, a filter 23 in the ink supply line 12 downstream of the intermediary ink tank 6 for filtering ink supplied to the printhead 4, and a compliance 25 in the ink return line between the printhead outlet 16 and the circulation pump 20 for dampening ink pressure fluctuations. The filter 23 may be, for example, of the type described in U.S. Pat. No. 10,369,802, the contents of which are incorporated herein by reference. Alternatively, the filter 23 may be integrated into the intermediary ink tank 6, as described in U.S. Provisional Application No. 62/990,911 filed Mar. 17, 2020, the contents of which are incorporated herein by reference.

The ink delivery system 1 is designed to circulate ink around the closed fluidic loop, through the ink supply line 12 and the ink return line 18 in a clockwise direction as shown in FIG. 1, during normal printing. In this way, ink can be continuously degassed and filtered to maintain optimal print quality by minimizing air bubbles and particulates entering the printhead 4.

Ink consumed by the printhead 4, either via normal printing or maintenance operations, is replenished from a bulk ink reservoir 24, which feeds ink into the return line 18 via an ink refill line 26 having a refill pump 28. Actuation of the refill pump 28 is controlled by feedback from 'high' and 'low' ink level sensors 27A and 27B of the intermediary ink 6. When ink is sensed at predetermined 'high' level in the intermediary ink tank 6, the refill pump 28 is deactuated; and when ink is sensed at a predetermined low' level in the intermediary ink tank 6, the refill pump is actuated so as to replenish ink in the closed fluidic loop from the bulk ink reservoir 24.

In order to deprime, isolate and/or replace the printhead 4, the print module 2 comprises an printhead shut-off valve 30 at an outlet side of the printhead 4 and an air intake line 32 controlled by an air shut-off valve 34 at an inlet side. An upstream pressure regulating valve 50 (described in detail hereinbelow), which additionally functions as an ink shut-off valve is positioned in the ink supply line 12 between the intermediary ink tank 6 and the print module 2. Accordingly, when it is required to deprime the printhead 4 (for example, for printhead replacement), the pressure regulating valve 50 is shut off while the air intake valve 34 is opened. Actuation of the circulation pump 20 pulls air through the printhead 4 thereby removing ink from internal ink supply channels. With ink removed from the printhead 4, the outlet shut-off valve 30 is closed, thereby isolating the printhead and allowing it to be cleanly removed and replaced. Typically, the printhead 4 is also isolated when the printing system is not in use by shutting off the pressure regulating valve 50 and the outlet shut-off valve 30.

For printhead priming operations, a vacuum capper (not shown) may be used in combination with the circulation pump 20 to draw ink through the ink supply channels of the printhead and into nozzles, as described in U.S. application Ser. No. 17/174,090 filed Feb. 11, 2021, the contents of which are incorporated herein by reference.

Pressure Regulation

As will be appreciated by those skilled in the art, it is important for the printhead 4 to receive ink at a regulated, predetermined backpressure in order to operate optimally. With an ink pressure that is too negative, ink pinned inside inkjet nozzles may be sucked back into the printhead channels, thereby depriming the printhead; with an ink pressure that is too positive ink may flood from the inkjet nozzles onto the nozzle plate of the printhead.

Gravity-fed ink delivery systems, such as those described in U.S. Pat. No. 10,639,903, have the advantage of passive control of backpressure. However, it is often inconvenient to position an intermediary ink tank below the printhead. In most inkjet printing systems, this space is occupied by maintenance systems, media feed systems and the like. Furthermore, an intermediary ink tank feeding ink to multiple printheads cannot achieve accurate, localized pressure control for each printhead.

Active pressure control systems, such as those described in U.S. Pat. No. 10,252,540 have the advantage of accurate localized pressure control without design constraints on the positioning of system components. However, such systems require expensive pumps and sensing circuitry that may not be economically feasible in smaller inkjet printing systems.

The ink delivery system 1 shown in FIG. 1 achieves localized passive regulation of backpressure in the printhead 4, whilst employing an intermediary ink tank 6 positioned above the printhead. The backpressure experienced at the printhead 4 is controlled by a combination of: a height $h_1$ of the intermediary ink tank 6 relative to the pressure regulating valve 50, a passively controlled flow rate through an orifice in the pressure regulating valve 50, a height $h_2$ of the pressure regulating valve relative to the printhead 4 and a pump speed of the downstream pump 20. The pressure-regulating valve 50 is a critical component of this system having the dual functions of: passive pressure regulation via relative occlusion of an orifice; and an ink shut-off valve for isolation of the printhead 4, deprime operations etc.

Figure 2:
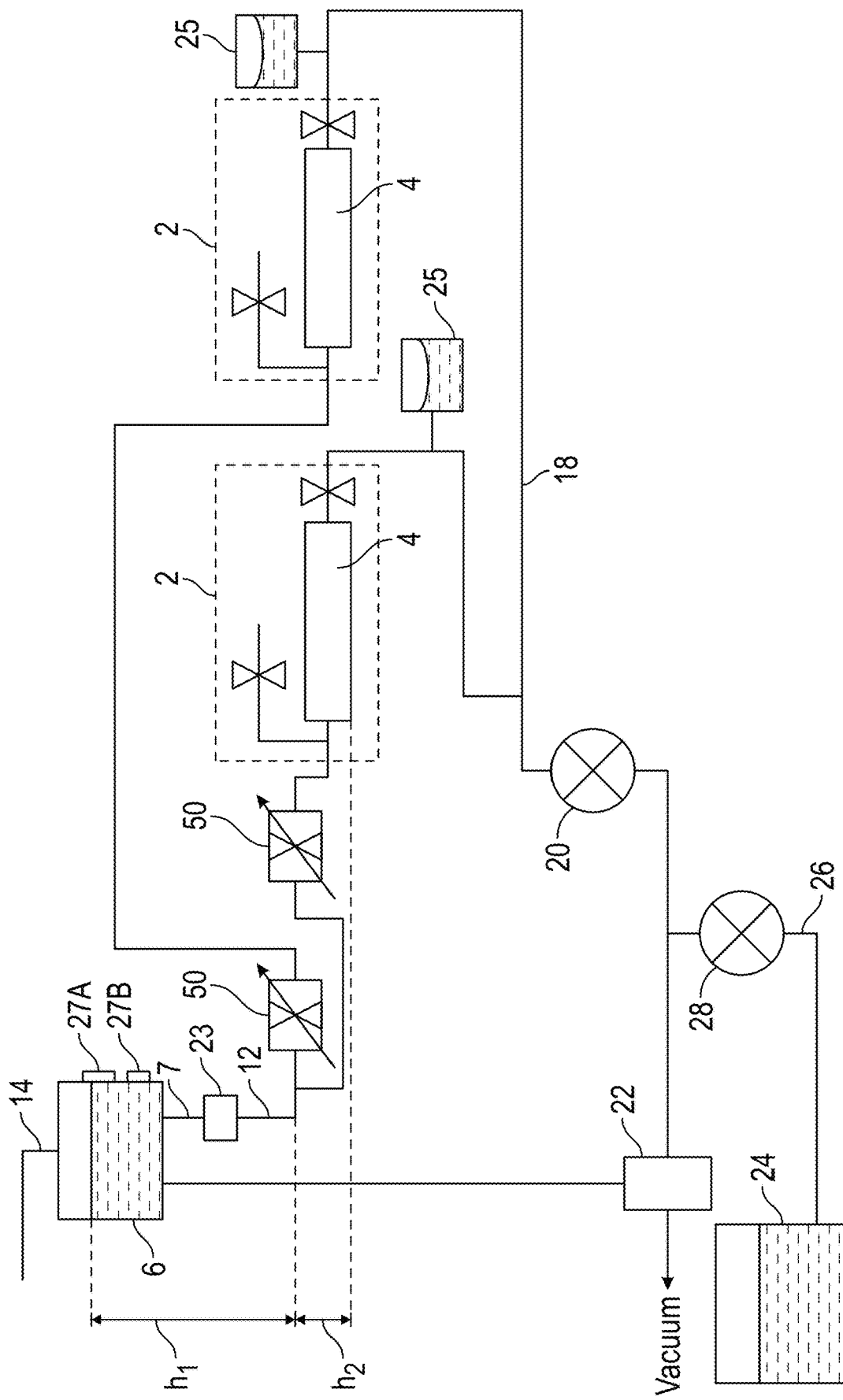
FIG. 2 shows an ink delivery system having two printheads.

Furthermore, since the pressure-regulating valve 50 is designed as a compact, inexpensive component of the ink delivery system 1, then it may be placed in close proximity to the printhead 4 and may, in some embodiments be incorporated into the print module 2, which is itself a replaceable module incorporating the replaceable printhead 4. Referring to FIG. 2, an ink delivery system incorporating two printheads 4 connected in parallel has a respective pressure-regulating valve 50 for each printhead, thereby providing local pressure control for each printhead from the common intermediary ink tank 6. In this way, if one printhead 4 has high ink demand relative to the other printhead, then both printheads can be maintained at a relatively equal ink pressure via operation of the respective pressure-regulating valves 50.

Figure 3:
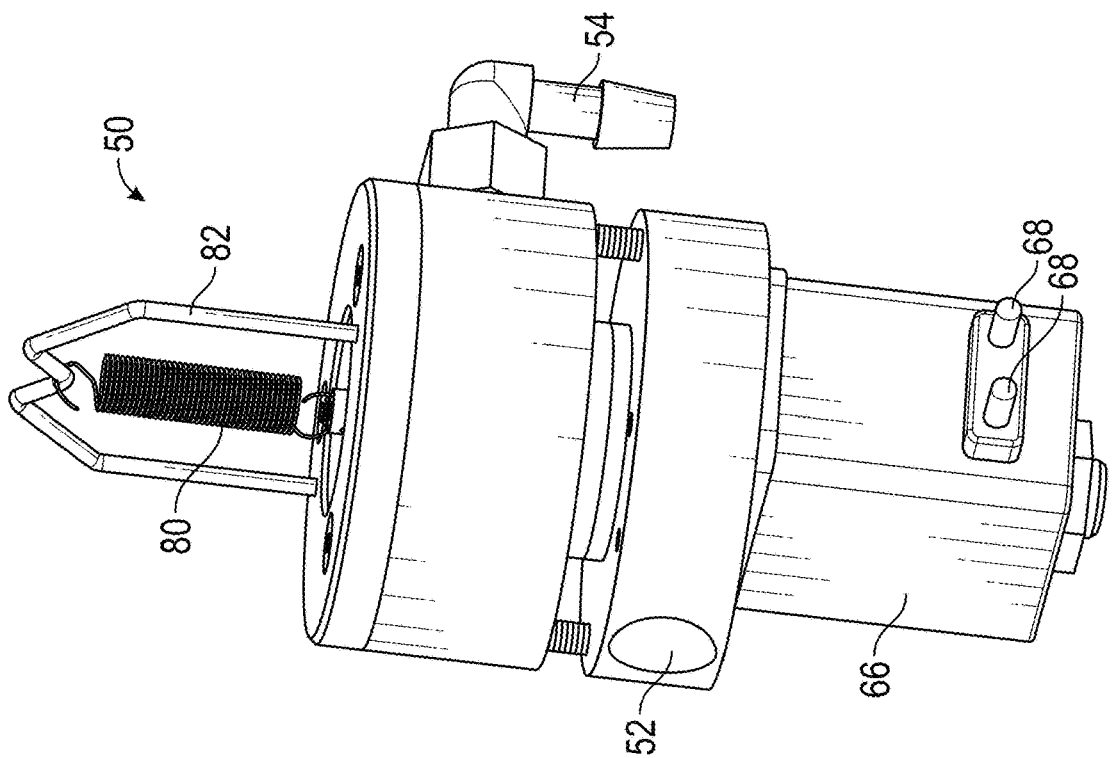
FIG. 3 is a perspective of a pressure regulating valve.

The pressure-regulating valve 50 will now be described in detail with reference to FIGS. 3 and 4. The pressure regulating valve 50 comprises a valve inlet 52, a valve outlet 54 and a fluid flow path defined therebetween. A first orifice 56 is positioned in the flow path downstream of the valve inlet 52. The first orifice 56 has a first seat 58, which is sealable by means of a movable first valve member 60 having a compliant plug 62 configured for sealing engagement with the first seat. As shown in FIG. 2, the first valve member 60 is shown in a shut position whereby the compliant plug is sealed against the first seat 58. Movement of the first valve member 60 away from the first seat (downwards as shown in FIG. 2) unseats the valve member from the first seat and opens the first orifice, allowing fluid to flow therethrough under positive pressure from the valve inlet 52. Movement of the first valve member 60 between open and shut positions is controlled by an actuator in the form of solenoid 66. With the solenoid 66 actuated, the first valve member 60 moves away from the first seat 58 to open the first orifice 56; and the with the solenoid 66 deactuated, the first valve member 60 is sealed against the first seat 58 to close the first orifice 56. The solenoid 66 is operated under the control of a separate controller (not shown) operatively connected to electrical terminals 68. Accordingly, the first orifice and first valve member, under the control of the solenoid 66, function as a shut-off valve in the ink supply line 12.

A second orifice 70 is positioned in the flow path downstream of the first orifice 56, the first and second orifices being connected via an intermediary flow channel 72. The second orifice 70 is defined in a base of a regulator chamber 74, which forms an upper part of the pressure-regulating valve 50. The regulator chamber 74 comprises the valve outlet 56 positioned in a sidewall thereof and a diaphragm 76 positioned in a roof thereof. The diaphragm 76 is operatively connected to a second valve member 78, which is slidably movable relative to the second orifice 70 so as to progressively occlude or progressively open the second orifice. The second valve member 78 is biased away from the second orifice 70 by means of a spring 80 having one end connected to the diaphragm 76 (and second valve member 78) and an opposite end connected to a fixed support 82. In the embodiment shown in FIGS. 1 and 2, the fixed support 82 is an external structure; however, it will be appreciated that the fixed support 82, having one end of the spring 80 connected thereto, may be integrated into the roof of the regulator chamber 74 with the spring extending through an internal roof cavity (not shown).

Figure 4:
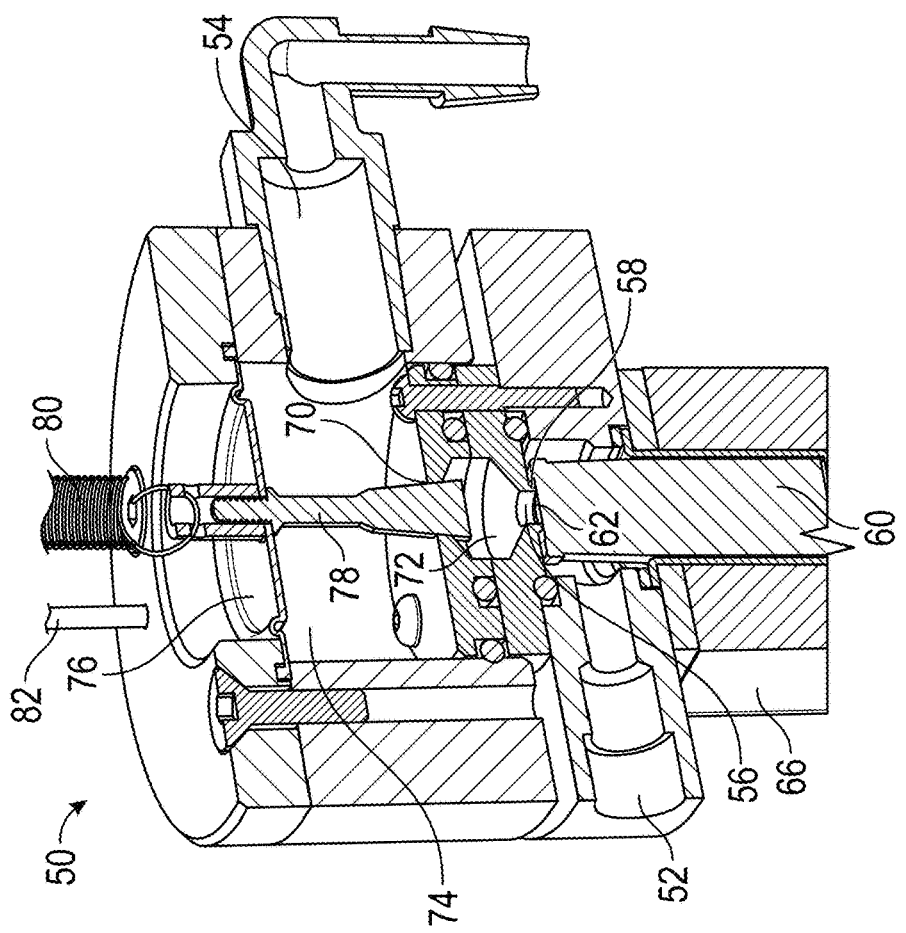
FIG. 4 is a sectional perspective of the pressure regulating valve.

By virtue of the second valve member 78 being flared away from the diaphragm 76, movement of the second valve member towards the second orifice 70 (i.e. downwards as shown in FIG. 4) results in progressive opening of the second orifice, and movement of the second valve member away from the second orifice (i.e. upwards as shown in FIG. 4) results in progressively occlusion of the second orifice. As shown in FIG. 4, the second orifice 70 is shown in a closed position with the diaphragm 76 unflexed. However, the second orifice 70 and second valve member 78 have no function in shutting off the pressure-regulating valve 50 and function solely to regulate a flow rate of fluid through the second orifice. Hence, the second valve member 78 and second orifice 70 have rigid engagement surfaces with no sealing function. Typically, the second valve member 78 and second orifice 70 are formed of metal and/or rigid plastics.

During printing, the first orifice 56 is open by means of actuation of the solenoid 66 and flow rate through the pressure-regulating valve 50 is passively controlled by a position of the second valve member 78 relative to the second orifice 70. With a high ink demand, the printhead 4 pulls a relatively greater negative pressure at the valve outlet 54, thereby decreasing fluid pressure in the regulator chamber 74. This decreased fluid pressure tends to flex the diaphragm 76 towards the second orifice 70 against the bias of the spring 80, thereby increasing the flow rate of fluid through the second orifice. Conversely, when the fluid pressure in the regulator chamber 74 increases, the diaphragm flexes away from the second orifice 70, thereby decreasing the flow rate of fluid through the second orifice. Thus, the ink pressure experienced at the printhead 4 is determined, at least in part, by the balance of forces between the flexing diaphragm 76 and the spring 80.

Advantageously, since the second valve member 78, which controls ink pressure at the printhead 4, has no shut-off function, problems of hysteresis caused by an opening and closing valve, as well as problems of valve-sticking are minimized.

Figure 5:
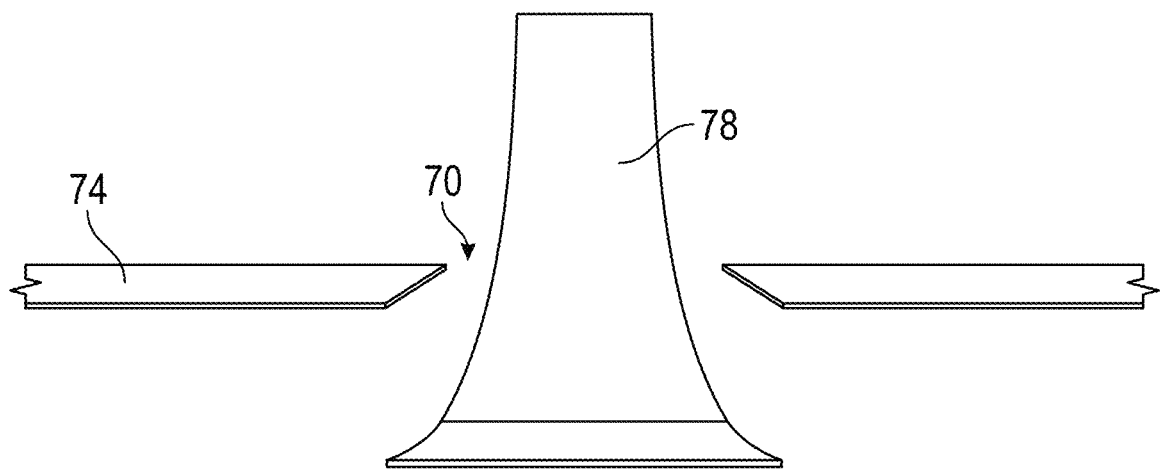
FIG. 5 is a side view of a valve member for regulating flow rate through an orifice.

In a preferred embodiment shown in FIG. 5, the outer surface of the second valve member 78 is non-linearly flared. For example, the second valve member 78 may be generally bell-shaped or trumpet-shaped, whereby a curved outer surface thereof determines an extent of occlusion of the second orifice 70. In this way, linear movement of the second valve member 78 relative to the second orifice 70 produces a linear change in a non-occluded area of the second orifice. The non-occluded area of the second orifice 70 is proportional to the flow rate therethrough, such that the flow rate is linearly proportional to a distance moved by the second valve member 78 having, for example, a trumpet shape.

It will, of course, be appreciated that the present invention has been described by way of example only and that modifications of detail may be made within the scope of the invention, which is defined in the accompanying claims.

The invention claimed is:

1. An ink delivery system for supplying ink to an inkjet printhead at a predetermined backpressure, the ink delivery system comprising:
    a pressure regulating valve having a valve outlet connected to a printhead inlet port, the pressure regulating valve having a passively-controlled valve member for controlling a flow rate of ink through an orifice;
    an ink tank connected to a valve inlet of the pressure regulating valve, the ink tank being positioned above the pressure regulating valve and the printhead, the ink tank having an air vent open to atmosphere for suppling ink to the pressure regulating valve under gravity; and
    a pump connected to a printhead outlet port,
    wherein:
    a level of ink in the ink tank is at a height $h_1$ above the orifice;
    the orifice is positioned at a height $h_2$ relative to the printhead; and
    the backpressure of ink supplied to the printhead is controlled by: $h_1$, $h_2$, a position of the valve member relative to the orifice and a pump speed of the pump.

2. The ink delivery system of claim 1, wherein the pump is connected to the ink tank via an ink return line.

3. The ink delivery system of claim 1, wherein the pressure regulating valve comprises:
    a regulator chamber having a diaphragm operatively connected to the valve member, such that movement of the diaphragm moves the valve member relative to the orifice; and
    a biasing mechanism for resiliently biasing the diaphragm away from the orifice.

4. The ink delivery system of claim 1, wherein the biasing mechanism comprises a spring operatively connected to the diaphragm, wherein the spring biases the valve member towards closure of the orifice.

5. The ink delivery system of claim 4, wherein, in use, the diaphragm and the spring cooperate to passively control a flow rate through the orifice.

6. The ink delivery system of claim 1, wherein movement of the diaphragm towards the orifice progressively opens the orifice thereby to increase a flow rate therethrough, and movement of the diaphragm away from the orifice progressively occludes the orifice to decrease the flow rate therethrough.

7. The ink delivery system of claim 6, wherein a decrease in pressure in the regulator chamber moves the diaphragm towards the orifice.

8. The ink delivery system of claim 7, wherein an outer surface the valve member is flared away from the diaphragm.

9. The ink delivery system of claim 7, wherein the outer surface of the valve member is non-linearly flared.

10. The ink delivery system of claim 7, wherein linear movement of the valve member relative to the orifice produces a linear change in an occluded area of the orifice, such that the flow rate through the orifice is linearly proportional to a distance moved by the valve member.

11. The ink delivery system of claim 1, wherein the height $h_1$ is controlled via one or more ink level sensors cooperating with a refill pump receiving ink from a bulk ink reservoir.

12. The ink delivery system of claim 1, wherein the pressure regulating valve is positioned above or below the printhead.

13. The ink delivery system of claim 1 comprising a plurality of printheads, each printhead and a corresponding plurality of pressure regulating valves, each printhead and respective pressure regulating valve being connected in parallel to a common ink tank.

* * * * *